United States Patent
Kemper

(10) Patent No.: US 7,222,361 B2
(45) Date of Patent: May 22, 2007

(54) COMPUTER SECURITY WITH LOCAL AND REMOTE AUTHENTICATION

(75) Inventor: Stefan Kemper, Boise, ID (US)

(73) Assignee: Hewlett-Packard Development Company, L.P., Houston, TX (US)

(*) Notice: Subject to any disclaimer, the term of this patent is extended or adjusted under 35 U.S.C. 154(b) by 751 days.

(21) Appl. No.: 10/003,138

(22) Filed: Nov. 15, 2001

(65) Prior Publication Data

US 2003/0093690 A1 May 15, 2003

(51) Int. Cl.
*H04L 9/32* (2006.01)
*H04L 9/00* (2006.01)
*H04M 1/66* (2006.01)

(52) U.S. Cl. .................. 726/4; 726/27; 713/168; 455/410

(58) Field of Classification Search ............ 713/200, 713/168; 726/4, 27; 455/410

See application file for complete search history.

(56) References Cited

U.S. PATENT DOCUMENTS

| 5,235,642 | A | 8/1993 | Wobber et al. ............... 380/25 |
| 6,430,694 | B1* | 8/2002 | Hosein et al. ............... 713/400 |
| 6,463,474 | B1* | 10/2002 | Fuh et al. ................... 709/225 |
| 6,542,994 | B1* | 4/2003 | Dircks et al. ............... 713/201 |
| 6,856,800 | B1* | 2/2005 | Henry et al. ................ 455/411 |

* cited by examiner

Primary Examiner—Ayaz Sheikh
Assistant Examiner—Kaveh Abrishamkar

(57) ABSTRACT

A secure computer system including a client having a client database for locally-authenticating a user; and a server, in communication with the client, having a server database for remotely-authenticating the user in response to a request from the client. The system also provides updating of the client database according to results of the local and remote authentication.

20 Claims, 3 Drawing Sheets

COMPUTER SECURITY WITH LOCAL AND REMOTE AUTHENTICATION

TECHNICAL FIELD

The subject matter disclosed here generally relates to security support for electrical computers and digital processing systems, and, more particularly, to an apparatus, method, and logic for authentication and authorization of a user.

BACKGROUND

Authentication and authorization are important aspects of any security system, including computer security systems. "Authentication" refers to the verification of the identity of a person or process before they perform other system actions. In a communication system, authentication may involve simply verifying that a message comes from its stated source. For example, a bank might compare the signature on a hand-written check to a sample signature on file. Like signatures, however, many other forms of personal identification can also be forged. Consequently, so-called "strong authentication" uses a combination of items belonging to at least two of the following three categories: 1) personal knowledge (such as a password or personal identification number); 2) personal possessions (such a cardkey or other physical token); and 3) personal characteristics (such as a handwriting sample, voiceprint, fingerprint, or retina scan).

In general terms, "authorization" is the process of enforcing policies for authenticated entities, such as policies for determining what types of activities, resources, or services may be used. Typically, once an entity has been authenticated, the authorization process will determine whether that entity has the authority to issue certain commands. For example, in the check-writing scenario described above, a bank might confirm the availability of funds in the payer's account before following the instruction on the check to transfer funds to the payee. Similarly, in an electronic computer system, the authorization process may automatically provide an authenticated individual (who is logged on with the correct username and password) with the authority to issue any command. In fact, "access control" is the primary means for enforcing authorization policies by granting, denying, and/or terminating access to an unauthorized process or device.

Authentication, authorization, and accounting ("AAA") is a term that is sometimes used to describe a general framework for intelligently controlling access to computer resources, enforcing policies, auditing usage, and providing the information necessary to manage those resources. Various Requests for Comments ("RFC's") of the Internet Engineering Task Force ("IETF") discuss such a framework and are incorporated by reference here, including RFC 2903 entitled "Generic AAA Architecture," RFC 2904 entitled "AAA Authorization Framework," RFC 2905 entitled "AAA Authorization Application Examples," and RFC 2906 entitled "AAA Authorization Requirements." In general terms, these documents describe a system where an "AAA server" is used to provide authentication, authorization, and/or accounting services in response to a user's request. The AAA server inspects the contents of the request, determines what authorization is requested, retrieves policy rules from a repository, and then either grants the requested access or passes along the request to another AAA server.

One standard protocol by which many devices and applications communicate with an AAA server is the Remote Authentication Dial-In User Service ("RADIUS") described in Request for Comment ("RFC") 2865, and others, of the Internet Engineering Task Force ("IETF") which is also incorporated by reference here. RADIUS is a client/server protocol that enables remote access servers to communicate with a central server in order to authenticate dial-in users and authorize their access to a requested system or service. RADIUS allows an organization to maintain user profiles in a central database that all remote servers can share. It thus provides for improved security by allowing computer resource owners to administer their authorization policies at a single network point.

RADIUS and other such security protocols that rely on centralized databases for authorization can be quite slow, especially when implemented with low capacity communications networks. For example, in many prior art systems, authentication requires digitally signing the request, as well as the exchange of information called "credentials" between the requester and the server. The authentication process can therefore impose significant overhead on the operation of distributed computer systems, especially when the number of requests transmitted is high.

U.S. Pat. No. 5,235,642 to Wobber et al. discloses an apparatus and method for making such access control systems more efficient by caching authentication credentials. A computer at each node of a distributed system has a trusted computing base that includes an authentication agent for authenticating requests received from principals at other nodes in the system. Requests are transmitted to the servers as messages that include a first identifier (called an Auth ID) provided by the requester and a second identifier provided (called the subchannel value) by the authentication agent of the requester node.

Each server process has an associated local cache that identifies requesters whose previous request messages have been authenticated. When a request is received, the server checks the request's first and second identifiers against the entries in its local cache. If there is a match, then the request is known to be authentic, without having to obtain authentication credentials from the requester's node.

If the identifier in a request message does not match any of the entries in the server's local cache, then the server node's authentication agent is called to obtain authentication credentials from the requester's node to authenticate the request message. Upon receiving the required credentials from the requester node's authentication agent, the principal identifier of the requester and the received credentials are stored in a local cache by the server node's authentication agent. The server process also stores a record in its local cache indicating that request messages from the specified requester are known to be authentic, thereby expediting the process of authenticating received requests.

Although the Wobber et al. server cache may help minimize server loads, it does not address the problem of communication load and/or lag times between the client requester and the server.

SUMMARY

These and other drawbacks of conventional approaches are addressed here by providing a secure computer device including means for locally-authenticating a user of the device; and means for generating an authentication request to a server. The disclosure also relates to a computer security method including the steps of locally-authenticating a user of a client device, and generating an authentication request to a server. In another embodiment, the disclosure relates to a computer readable medium, including logic for locally-authenticating a user of a client device, and logic for generating an authentication request to a server. In yet another embodiment, the disclosure relates to a secure computer system including a client having a client database for locally-authenticating a user; a server, in communication with the client, having a server database for remotely-authenticating the user in response to a request from the client; and means for updating the client database according to results of the local and remote authentication.

BRIEF DESCRIPTION OF THE DRAWINGS

Various aspects of the invention will now be described with reference to the following figures ("FIGS.") which are not necessarily drawn to scale, but use the same reference numerals to designate corresponding parts throughout each of the FIGs.

DETAILED DESCRIPTION OF THE PREFERRED EMBODIMENTS

Figure 1:
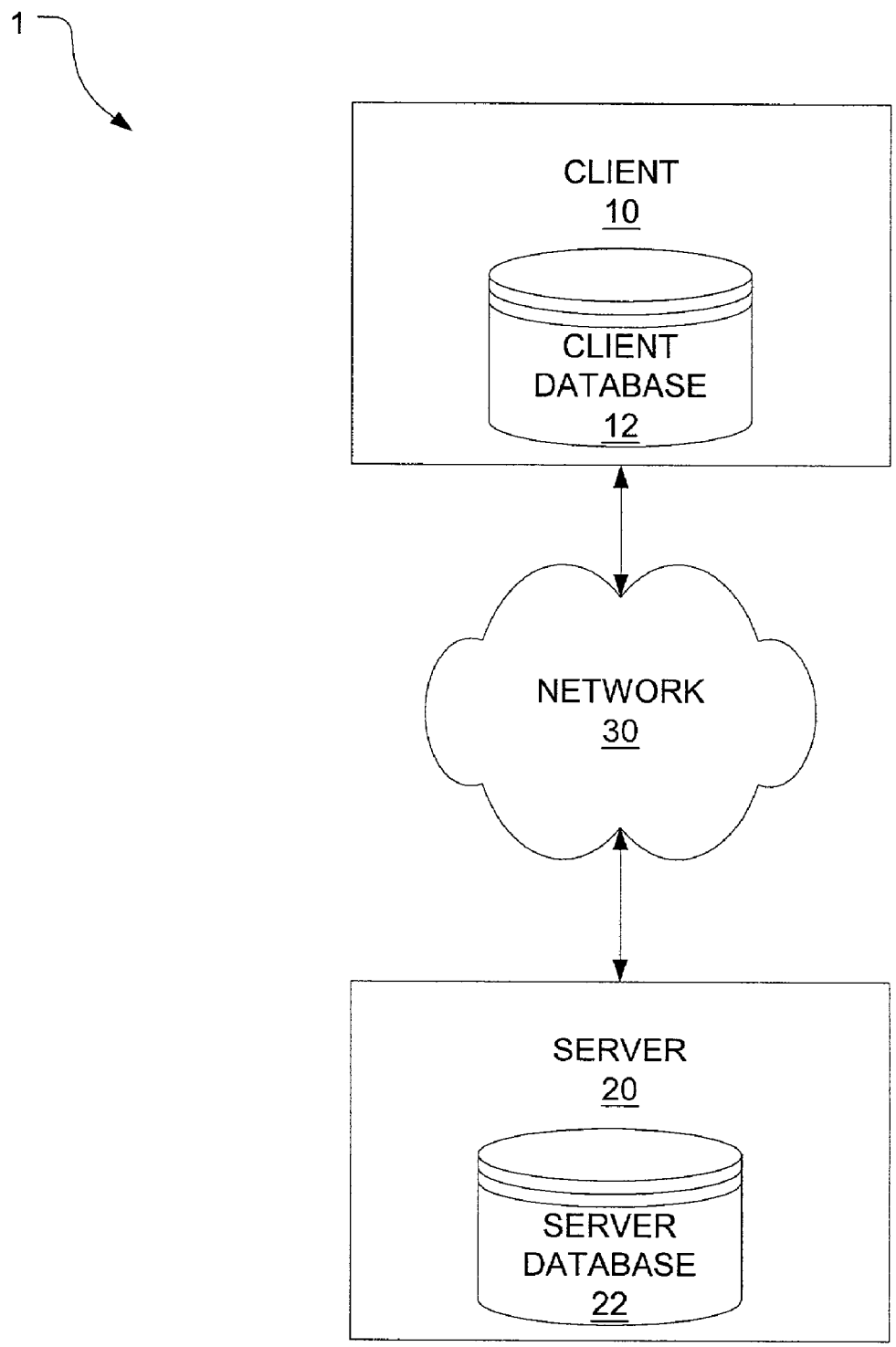
FIG. 1 is a schematic block diagram an architecture for implementing a an authentication and authorization system.
Figure 2:
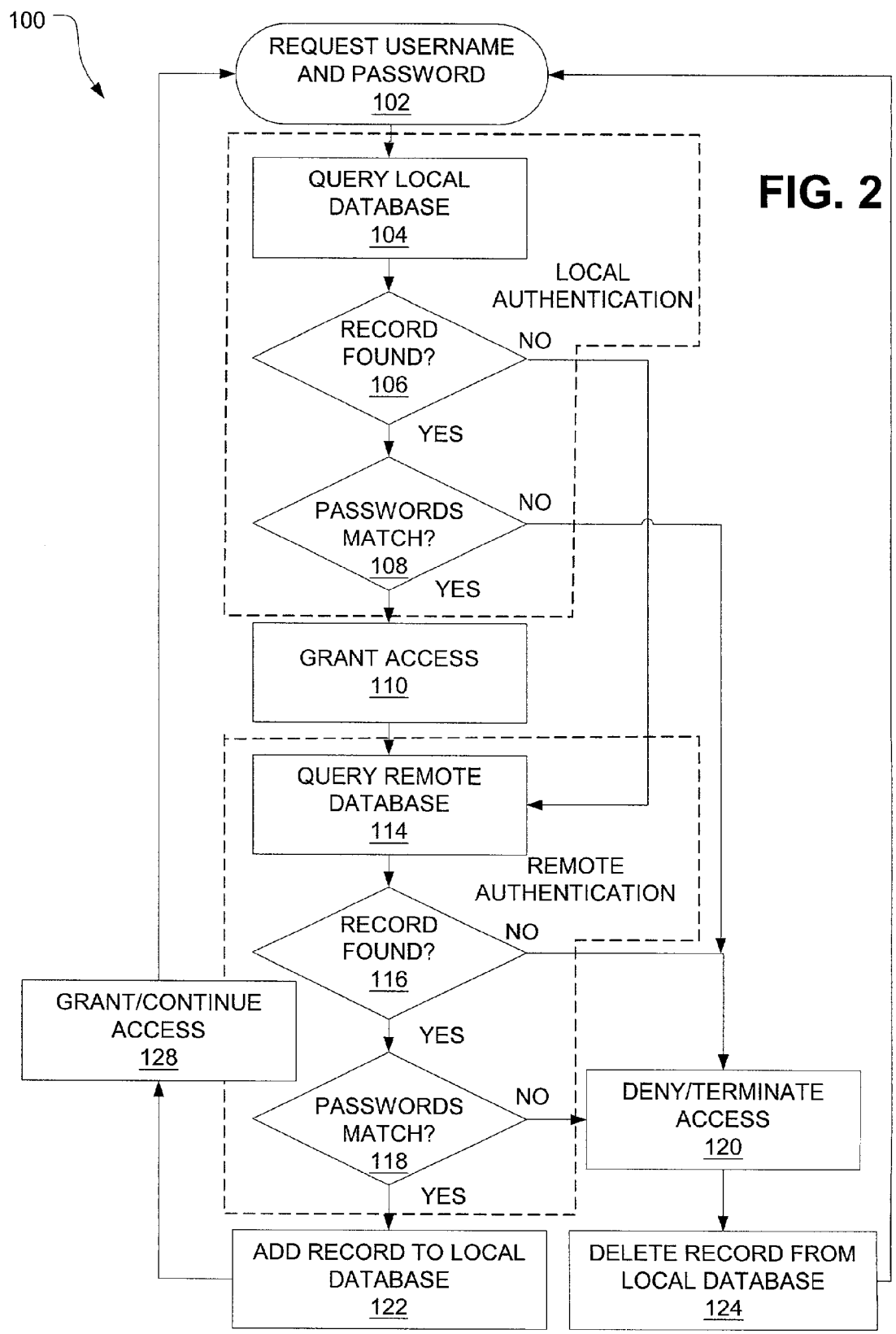
FIG. 2 is a flow chart illustrating one embodiment of an authentication and authorization system.
Figure 3:
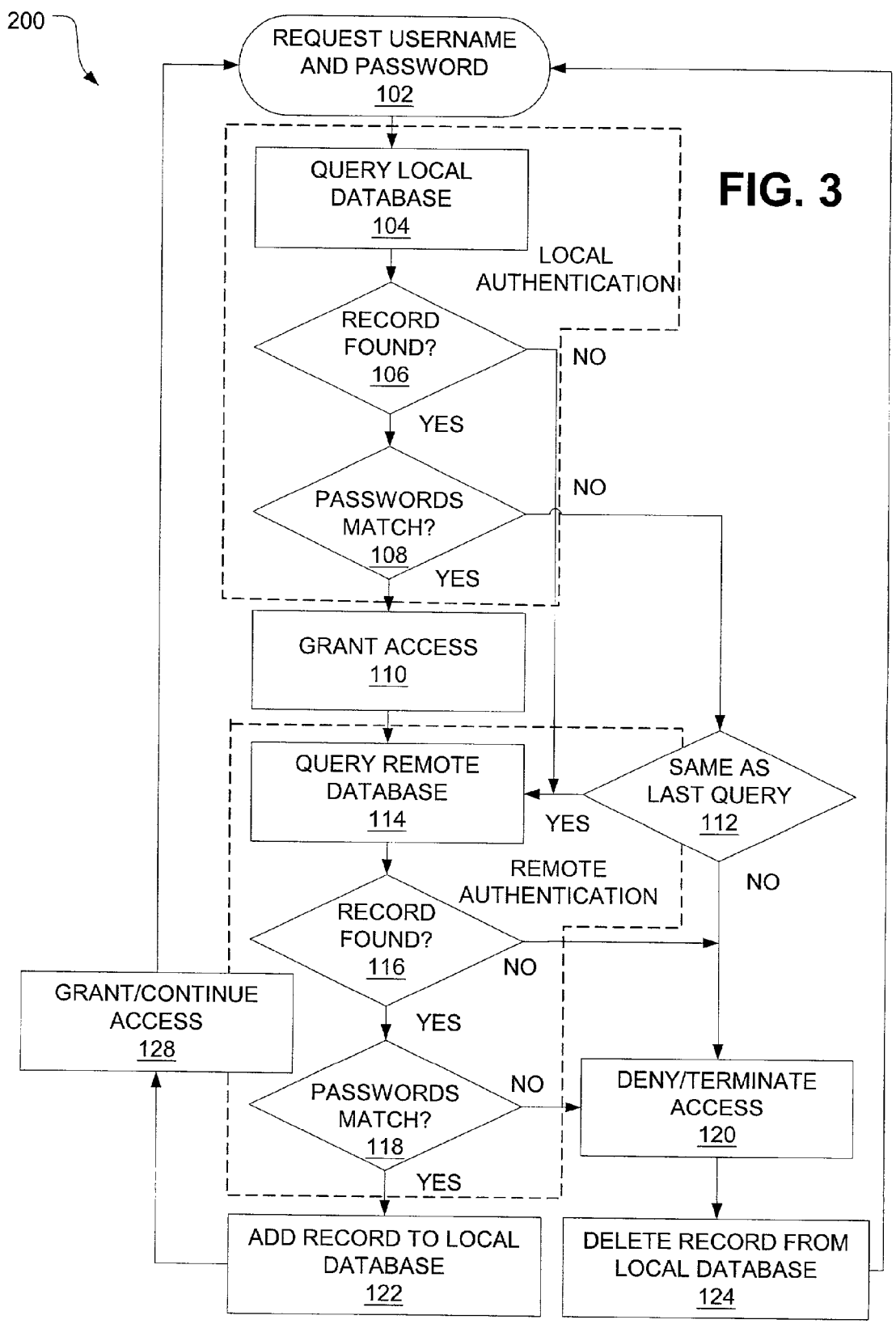
FIG. 3 is a flow chart for another embodiment of an authentication and authorization system.

FIGS. 1–3 illustrate various aspect of an authentication and authorization ("AA") system that provides fast (but potentially unwarranted) local authentication followed by slower (but more accurate) remote authentication. Upon a successful local authentication, immediate access will be provided and the remote authentication will be carried out in the background. Any unwarranted access based upon a successful local authentication is subsequently terminated by an unsuccessful remote authentication. The local authentication data may also be modified when the results of one of the local and remote authentications are different from each other.

The terms "local" and "remote" are used here to convey that communication between, and/or processing by, various parts of a distributed system. It is not necessary that any part of the system be arranged at physically distant locations from other parts of the system. However, greater communications distances often require more communication resources and/or longer communications intervals. In any event, local authentication will typically occur relatively quickly, and/or require less resources, than remote authentication.

Various aspects of the AA system are described below with respect to the computer architecture shown in FIG. 1. The computer architecture shown in FIG. 1 is based upon a client/server computer network model. However, a variety of other distributed configurations, topologies, and/or communications systems may also be used. Non-computerized architectures may also be used including mechanical, pneumatic, hydraulic, chemical, biological, electromagnetic, and/or electrical system architectures.

For the computer system 1 illustrated in FIG. 1, the client 10 is a local device that sends requests for action to a remote server device 20 which then replies to the request. The requests and the replies are typically communicated over a network 30 according to a variety of protocols including, but not limited to, the TCP/IP protocol. However, the client 10 and server 20 may communicate via other technologies. For example, the client 10 and the server 20 may be in direct communication, such as by a cable, without the network 30. Additional clients 10 (not shown) may also be arranged in communication with one or more servers 20.

The client 10 provides for interaction with a "user" (not shown) seeking authorization for certain activities, services, and/or resources available on the system 1. The term "user" includes a person, process, another computer, and or other device seeking authorization. In the example described here, authorization is provided by granting or continuing access to some, or all, of the computer system 1 via the client 10. However, various other authorization policies may also be implemented.

For example, the client 10 could be a physical control device (such as a door lock), Windows NT workstation, automatic teller machine, or a Digital Sender communication device (available from Hewlett-Packard Company) that receives input directly from a person. Granting or continuing access to these users would, respectively, allow the user to change control parameters (such as unlocking the lock), access network resources, conduct banking transactions, or send communications. Alternatively, human input may be provided indirectly to the client 10 from another device (not shown) or process that may have direct interaction with a user, such as a proximity sensor. In yet another implementation, input to the client device may be received from another device or process (or other device) without human interaction, such as by a timing signal.

FIGS. 1–3 generally refer to a local client 10 having a client database 12 and a remote server 20 having a server database 22. For the illustrated example, the databases 12 and 22 contain usernames and passwords. However, either or both of the username and password may be other forms of identification including, but not limited to, personal knowledge, personal possessions or personal characteristics as described above with regard to strong authentication. Similarly, any other number of identification items may also be requested from the user and/or made available in the corresponding databases 12 and 22. Alternatively, the identification information represented by the databases 12 and 22 could be the expected result of a calculation, or other process, based upon identification inputs provided by a user.

The server database 20 is typically used as a large, central repository for the most current identification data for all authorized users. This allows an administrator to maintain a single server, such as the AAA server discussed above, that can be used by all clients. The identification data in the client database 12 may then be updated an/or synchronized with current data from the server database 22 on an as-needed basis, such as by adding or deleting records (or changing other information) from the client database 10. In addition, the client database 10 may be periodically updated and/or synchronized with the current data from the server 22 on a less frequent basis.

FIGS. 2 and 3 are flow charts illustrating two embodiments of authentication and authorization ("AA") systems 100 and 200. More specifically, these figures show the architecture, functionality, and operation of AA systems 100, 200 that may be implemented with the secure computer system 1 shown in FIG. 1. However, as noted above, the AA systems 100, 200 may be implemented in a wide variety of electrical, electronic, computer, mechanical, and/or manual configurations. Nonetheless, in a preferred embodiment, the AA systems 100, 200 are at least partially computerized with various aspects of the synchronization system being implemented by software, firmware, hardware, or a combination thereof. For example, the software may be a program that is executed by the client 10 and/or server 20 including a special purpose or general-purpose digital computer, such as a personal computer (PC, IBM-compatible, Apple-compatible, or otherwise), workstation, minicomputer, or mainframe computer.

Each block in FIGS. 2 and 3 represents an activity, step, module, segment, or portion of computer code that will typically comprise one or more executable instructions for implementing the specified logical function(s). It should also be noted that, in various alternative implementations, the functions noted in the blocks will occur out of the order noted in the figures. For example, multiple functions in different blocks may be executed substantially concurrently, in a different order, incompletely, or over an extended period of time, depending upon the functionality involved. Various steps may also be completed manually or with the aid of other devices and/or processes.

Turning now to FIG. 2, the authentication and authorization system 100 begins at step 102 with the local client device 10 waiting to receive authorization data, such as a user name and password, from a user who wants authorization for (i.e. access to) the system 1 shown in FIG. 1. Once the user name and password (or other authentication data) is entered, or otherwise provided, then the client database 12 is queried at step 104 in order to determine whether records corresponding to that authentication data reside in the client database 12.

The client database 12 is also referred to as a "local" database, or "cache," in order to indicate that this query takes place relatively quickly, typically without otherwise time-consuming communications. For example, the client database 12 will typically include less than all of the records that are contained in the server database 22 and/or may be implemented with a fast memory device. Thus, if a username, or other record identifier is found in the client database 12 at step 106, along with the appropriate password at step 108, then the user is granted immediate access at step 110. This "local authentication" will occur in the foreground while the user is waiting for access at step 110.

As shown in the figures, the username and password queries are preferably performed sequentially. However, they may also be formed substantially simultaneously and/or in reverse order.

If immediate access (or other authorization) is not granted during the local authentication, then more time-consuming communications are initiated in conjunction with through the server 20. This "remote authorization" will occur in the background, when the user has already been granted access at step 110. The user may therefore experience a fast, local authorization, even though access may be terminated during the slower, remote authorization. If access was not granted at step 110, the remote authorization will occur in the foreground while the user continues to wait for access.

More specifically, if it is determined that step 106 that there is no record in the client database 12 having the queried username, then the client 10 will formulate and send an authentication request to the server 20 at step 114. The authentication request may be a complete query, or simply contain enough information for the server 20 to formulate a query, of the server database 22. If the record is found in the server database 22 at step 116, and the passwords match at step 118, then the client database 12 will be updated by the addition of the record at step 122. The process 100 may also be supplemented with procedures for limiting the number of times that a particular client database 10 and/or record in any, or all, of the client databases 10 will be updated during any period of time and/or total number of updates.

If access has not been previously granted at step 110, and the remote authentication is successful, then access will be granted at step 128. Conversely, if access has already been granted at step 110, then a successful remote authentication will continue that access before returning to step 102 where the system 1 continues working on the authorized activity. During such authorized activities, the client 10 may wait for a new username and password in order to begin a new activity, or the client may simply deny access for any new activities until the authorized activity is completed. The client 10 may also be configured to receive and/or store identification data from a subsequent user while the previous user's activity is being completed.

Returning to step 108, if the username has been found in the client database 12, but the password entered by the user at step 102 does not match the corresponding password in the client database, then access will be denied at step 120. Next, at step 124, the record corresponding to that username will be deleted from the local database at step 124. Similarly, if it is determined at step 116 or step 118 that the username or password does not match what is stored in the server database 22, then access will be denied or terminated (if previously granted at step 110) at step 120 before the record is deleted from the local database at step 124. If access was granted at step 110, then the remote authentication can be performed in the background with the user unaware, unless the remote authorization is unsuccessful and access is terminated at step 120.

The record additions and/or deletions at steps 122 and 124 may be implemented by an instruction from the server 20 or completed locally by the client 10 depending upon whether there has been a query of the server database 22 at step 114. For example, the server 20 may formulate and send a message to the client 10 with sufficient information for instructing that the record be deleted. The illustrated process 100 may also be modified so that if access was not previously granted at step 110, then deletion of the record from the local database at step 124 is skipped before the client 10 returned to the waiting state at step 102. Similarly, addition of records at steps 122 could also be skipped if access at step 110 was previously granted.

FIG. 3 illustrates another embodiment of an authentication and authorization system 200 including all of the steps shown in FIG. 2 and an additional step 112. This added step operates so that, if there is a username match at step 106 and no password match at step 108, then a determination is made at step 112 as to whether the same password has been entered for consecutive authentication queries by the same user. If the password is the same as the last query at step 104, then the remote database is queried at step 114. If the consecutive passwords were not the same, then access is denied at step 120 (without sending a request to the server).

This additional feature prevents an old password in the client database 12 from "hiding" a newer password on the server. For example, passwords in the server database 22 may be set to automatically expire after a certain period of time. Under these circumstances, a new password would then be entered for an authorized user in the database 22 while an old password may still exist in the database 10.

The first time that the user enters the new password at step 102 in FIG. 3, there will not be a match at step 108 and access will be denied at step 120 without attempting remote authorization. The second time that the user enters new password, it will be the same as the last query at step 112 and a successful remote authorization will be initiated at step 114, resulting in the new password being added to the local database at step 122.

As noted above, the AA systems shown in FIGS. 2 and 3 are preferably implemented by software stored in memory and containing instructions that are executed by a processor, typically in connection with a suitable operating system, arranged with the client 10 and/or server 20. The memory may have volatile memory elements (e.g., random access memory, or "RAM," such as DRAM, SRAM, etc.), non-volatile memory elements (e.g., hard drive, tape, read only memory, or "ROM," CDROM, etc.), or any combination thereof. The memory may also incorporate electronic, magnetic, optical, and/or other types of storage devices. A distributed memory architecture, where various memory components are situated remote from one another, may also be used.

The processor(s) is preferably a hardware device for implementing software that is stored in the memory. The processor can be any custom-made or commercially available processor, including semiconductor-based microprocessors (in the form of a microchip) and/or macroprocessors. The processor may be a central processing unit ("CPU") or an auxiliary processor among several processors associated with the client 10 and/or server 20. Examples of suitable commercially-available microprocessors include, but are not limited to, the PA-RISC series of microprocessors from Hewlett-Packard Company, U.S.A., the 80×86 and Pentium series of microprocessors from Intel Corporation, U.S.A., PowerPC microprocessors from IBM, U.S.A., Sparc microprocessors from Sun Microsystems, Inc, and the 68xxx series of microprocessors from Motorola Corporation, U.S.A.

As noted above, the memory stores the software in the form of instructions and/or data for use by the processor in connection with a suitable operating system that may also be stored in the memory. The instructions will generally include one or more separate programs, each of which comprises an ordered listing of executable instructions for implementing one or more logical functions. The operating system implements the execution of these computer programs and may also provide various scheduling, input-output control, file and data management, memory management, communication control, and other related services. Various commercially-available operating systems may be used, including, but not limited to, the Windows operating system from Microsoft Corporation, U.S.A., the Netware operating system from Novell, Inc., U.S.A., and various UNIX operating systems available from vendors such as Hewlett-Packard Company, U.S.A., Sun Microsystems, Inc., U.S.A., and AT&T Corporation, U.S.A.

The program(s) stored in memory may include a source program (or "source code"), executable program ("object code"), script, or any other entity comprising a set of instructions to be performed as described in more detail below. In order to work with a particular operating system, any such source code will typically be translated into object code via a conventional compiler, assembler, interpreter, or the like, which may (or may not) be included within the memory. The programs may be written using an object oriented programming language having classes of data and methods, and/or a procedure programming language, having routines, subroutines, and/or functions. For example, suitable programming languages include, but are not limited to, C, C++, Pascal, Basic, Fortran, Cobol, Perl, Java, and Ada.

When any portion of the AA system is implemented in software, it can be stored on any computer readable medium for use by, or in connection with, any computer-related system or method. In the context of this document, a "computer readable medium" includes any electronic, magnetic, optical, or other physical device or means that can contain or store a computer program for use by, or in connection with, a computer-related system or method. The computer-related system may be any instruction execution system, apparatus, or device, such as a computer-based system, processor-containing system, or other system that can fetch the instructions from the instruction execution system, apparatus, or device and then execute those instructions. Therefore, in the context of this document, a computer-readable medium can be any means that will store, communicate, propagate, or transport the program for use by, or in connection with, the instruction execution system, apparatus, or device.

For example, the computer readable medium may take a variety of forms, including a computer-readable storage medium, a propagation medium, and paper. Specific examples of a computer-readable storage medium include a portable computer diskette, a random access memory ("RAM"), a read-only memory ("ROM"), an erasable programmable read-only memory ("EPROM" or Flash memory), and a portable compact disc read-only memory ("CDROM"). The computer readable medium could be also be a propagation medium including optical fiber and infrared. Finally, the computer-readable medium could even be paper or another suitable medium upon which the program is printed, as the program can be electronically captured, for instance via optical sensing or scanning of the paper, and then compiled, interpreted or otherwise processed in a suitable manner before being stored in the memory.

Where any portion of the AA system is at least partially implemented in hardware, the system may be implemented using a variety of technologies including, but not limited to, discrete logic circuit(s) having logic gates for implementing logic functions upon data signals, application specific integrated circuit(s) ("ASIC") having appropriate combinational logic gates, programmable gate array(s) ("PGA"), and/or field programmable gate array(s) ("FPGA").

It should be emphasized that the embodiments described above, and particularly any "preferred" embodiments, are merely examples of various implementations that have been set forth here to provide a clear understanding of various aspects of the invention. One of ordinary skill will be able to alter many of these embodiments without substantially departing from scope of protection defined solely by the proper construction of the following claims.

The invention claimed is:

1. A secure computer device, comprising:
   a client database locally-authenticating a user of the device;
   means for granting previously authorized access to the device if the user is locally authenticated;
   means for generating a remote authentication request;
   a server database remotely-authenticating the user in response to the authentication request after a successful local authentication;
   means for granting access to new activities and control parameters on the computer device if remote authentication is successful;
   means for allowing continued work on authorized activity;
   means for denying access to new activities until the authorized activity is completed;
   means for storing identification data from a subsequent user while a previous user's activity is being completed and updating the client database according to results of the local and remote authentications; and means for limiting a number of times that a particular client database and/or record in any, or all, of the client databases will be updated during any period of time and/or total number of updates.

2. The device recited in claim 1 further comprising means for authorizing the user in response to the successful local authentication.

3. The device recited in claim 2 further comprising means for withdrawing the authorization in response to a reply from the server.

4. The device recited in claim 1 further comprising means for updating the local user authenticating means in response to a reply from the server.

5. The device recited in claim 2 further comprising means for updating the local user authenticating means in response to a reply from the server.

6. The device recited in claim 3 further comprising means for updating the local user authenticating means in response to the reply from the server.

7. A computer security method, comprising the steps of:
locally-authenticating a user of a client device with a database of the client;
granting previously authorized access to the device if the user is locally authenticated;
generating an authentication request to a server;
remotely-authenticating the user with a database of the server in response to the authentication request after a successful local authentication;
granting access to new activities and control parameters on the computer device if remote authentication is successful unless the authorized activity is not completed, wherein the new activity is denied;
storing identification data from a subsequent user while a previous user's activity is being completed; and
updating the client database according to results of the local and remote authentications and limiting a number of times that a particular client database and/or, record in any, or all, of the client databases will be updated during any period of time and/or total number of updates.

8. The method recited in claim 7, further comprising the step of authorizing the user in response to a successful local authentication.

9. The method recited in claim 8 further comprising the step of withdrawing the authorization in response to a reply from the server.

10. The method recited in claim 7 further comprising the step of updating user authentication data stored on the client in response to a reply from the server.

11. The method recited in claim 8 further comprising the step of updating user authentication data stored on the client in response to the reply from the server.

12. The method recited in claim 9 further comprising the step of updating user authentication data stored on the client in response to a reply from the server.

13. A computer readable storage medium, comprising:
logic of a database client locally-authenticating a user of a client device;
logic granting previously authorized access to the device if the user is locally authenticated;
logic generating an authentication request to a server;
logic of a server database remotely authenticating the user in response to the authentication request after successful local authentication;
logic granting access to new activities and control parameters on the computer device if remote authentication is successful unless the authorized activity is not completed, wherein the new activity is denied;
storing identification data from a subsequent user while a previous user's activity is being completed;
logic updating the client database according to results of the local and remote authentications; and
logic limiting a number of times that a particular client database and/or record in any, or all, of the client databases will be updated during any period of time and/or total number of updates.

14. The computer readable storage medium recited in claim 13, further comprising logic for authorizing the user in response to the successful local authentication.

15. The computer readable storage medium recited in claim 14, further comprising logic for withdrawing an authorization in response to a reply from the server.

16. The computer readable storage medium recited in claim 13, further comprising logic for updating user authentication data stored on the client in response to a reply from the server.

17. The computer readable storage medium recited in claim 14, further comprising logic for updating user authentication data stored on the client in response to a reply from the server.

18. The computer readable storage medium recited in claim 15, further comprising logic for updating user authentication data stored on the client in response to a reply from the server.

19. A secure computer system, comprising:
a client having a client database, locally-authenticating a user;
an authentication device that grants previously authorized access if the user is locally authenticated;
a server, in communication with the client, having a server database, remotely-authenticating the user in response to a request from the client after a successful local authentication;
wherein the authentication device grants access to new activities and control parameters on the computer device if remote authentication is successful unless the authorized activity is not completed, wherein the new activity is denied;
storing identification data from a subsequent user while a previous user's activity is being completed;
means for updating the client database according to results of the local and remote authentications; and
means for limiting a number of times that a particular client database and/or record in any, or all, of the client databases will be updated during any period of time and/or total number of updates.

20. The secure computer system recited in claim 19, further comprising
means for authorizing a user in response to a successful local authentication; and
means for withdrawing the authorization In response to an unsuccessful remote authentication.

* * * * *

UNITED STATES PATENT AND TRADEMARK OFFICE
CERTIFICATE OF CORRECTION

PATENT NO. : 7,222,361 B2  Page 1 of 1
APPLICATION NO. : 10/003138
DATED : May 22, 2007
INVENTOR(S) : Stefan Kemper It is certified that error appears in the above-identified patent and that said Letters Patent is hereby corrected as shown below:

In column 9, line 37, in Claim 7, after "and/or" delete ",".

In column 10, line 61, in Claim 20, delete "In" and insert -- in --, therefor.

Signed and Sealed this

Eleventh Day of August, 2009

David J. Kappos
*Director of the United States Patent and Trademark Office*